United States Patent
Tamminen et al.

[11] Patent Number: 6,109,911
[45] Date of Patent: Aug. 29, 2000

[54] METHOD AND ARRANGEMENT FOR OPTIMIZING OXIDATION DURING BURNING OF GASEOUS AND LIQUID FUELS

[75] Inventors: Ari Tamminen, Pirkkala; Risto Syrjäläinen, Tampere; Heikki Koivuniemi, Lempäälä; Erkki Välimäki, Tampere, all of Finland

[73] Assignee: Kvaerner Pulping Oy, Tampere, Finland

[21] Appl. No.: 09/168,020

[22] Filed: Oct. 7, 1998

[30] Foreign Application Priority Data

Oct. 10, 1997 [FI] Finland ................................. 973932

[51] Int. Cl.[7] .............................. F23J 7/00; F23M 3/04; F23L 15/00
[52] U.S. Cl. ..................... 431/4; 431/8; 431/10; 431/190; 431/164; 110/303; 110/214; 110/265; 126/104 R
[58] Field of Search ............................. 431/4, 8, 10, 190, 431/252, 164; 110/303, 309, 313, 214, 251, 252, 260, 265; 126/109, 104 R

[56] References Cited

U.S. PATENT DOCUMENTS

| | | | |
|---|---|---|---|
| 3,685,946 | 8/1972 | Adams | 431/8 |
| 3,850,569 | 11/1974 | Alquist | 431/4 |
| 3,890,084 | 6/1975 | Voorheis et al. | 431/8 |
| 4,054,028 | 10/1977 | Kawaguchi | 431/10 |
| 4,147,115 | 4/1979 | Leppert | 110/261 |
| 4,331,638 | 5/1982 | Michelfelder | 431/10 |
| 4,405,587 | 9/1983 | McGill et al. | 431/4 |
| 4,427,362 | 1/1984 | Dykema | 431/4 |
| 4,440,100 | 4/1984 | Michelfelder et al. | 431/4 |
| 4,488,866 | 12/1984 | Schirmer et al. | 431/4 |
| 4,517,165 | 5/1985 | Moriarty | 431/4 |
| 4,519,993 | 5/1985 | McGill et al. | 431/10 |
| 4,790,743 | 12/1988 | Leikert et al. | 431/8 |
| 5,145,362 | 9/1992 | Obermueller | 110/214 |
| 5,419,286 | 5/1995 | Edison et al. | 431/4 |
| 5,584,684 | 12/1996 | Dobbeling et al. | 431/8 |

FOREIGN PATENT DOCUMENTS

| | | |
|---|---|---|
| 87949 | 11/1992 | Finland . |
| 951690 | 10/1996 | Finland . |
| WO92/01194 | 1/1992 | WIPO . |

*Primary Examiner*—Ira S. Lazarus
*Assistant Examiner*—David Lee
*Attorney, Agent, or Firm*—Rockey, Milnamow & Katz, Ltd.

[57] ABSTRACT

A method and an arrangement for reducing emissions of nitrogen oxides in a combustion apparatus provided with a tubular furnace. The method comprises burning odor gases at first sub-stoichiometrically, and subsequently supplying additional air to the furnace (3) in the transverse direction thereof in such a manner that the final air ratio is over 1. The arrangement comprises an additional air duct (7) which extends to the furnace of the boiler and from which additional air is supplied to the furnace (3) in the transverse direction of the furnace (3).

17 Claims, 2 Drawing Sheets

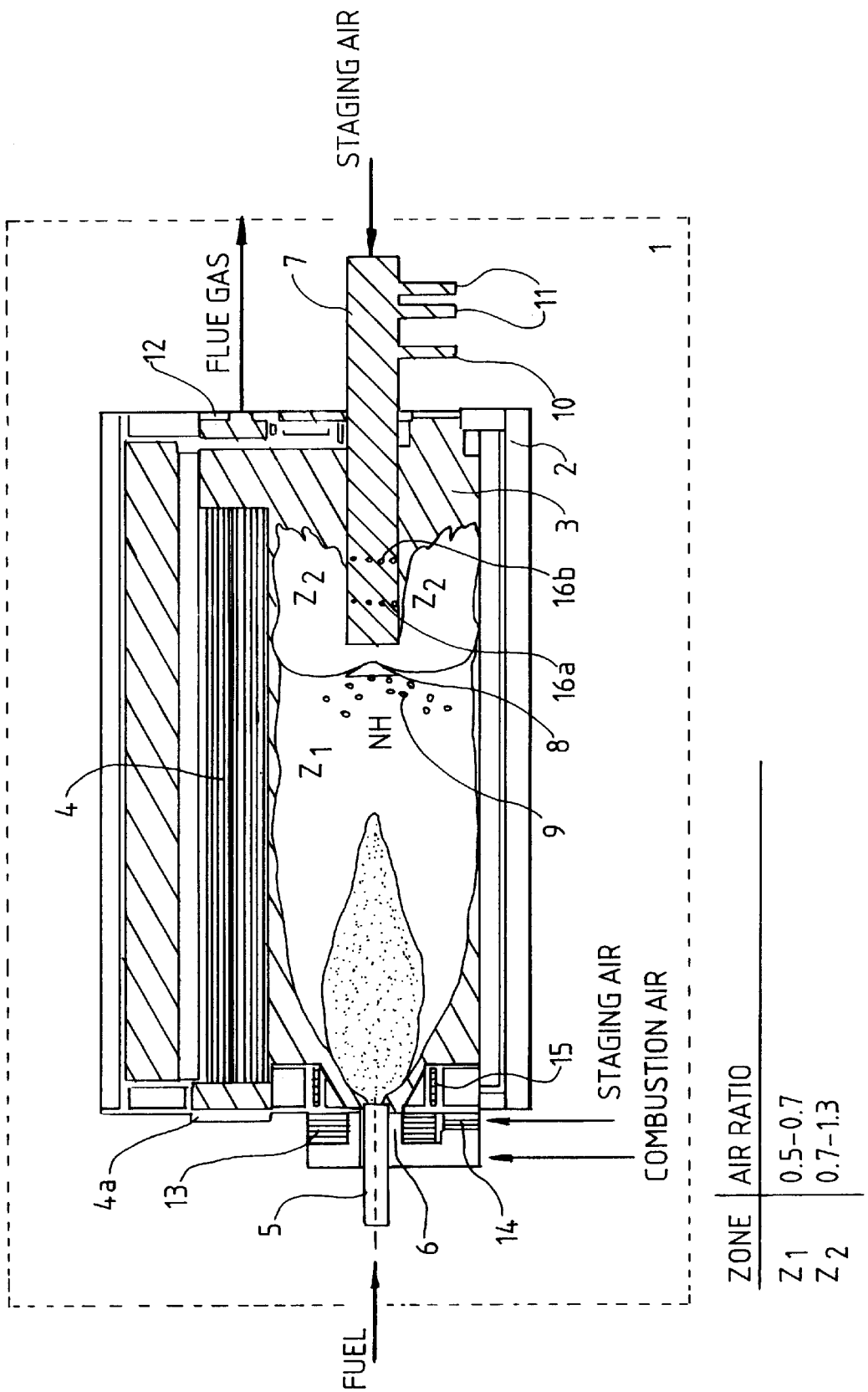

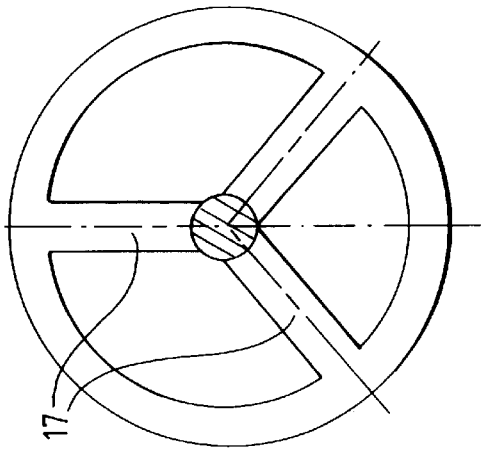
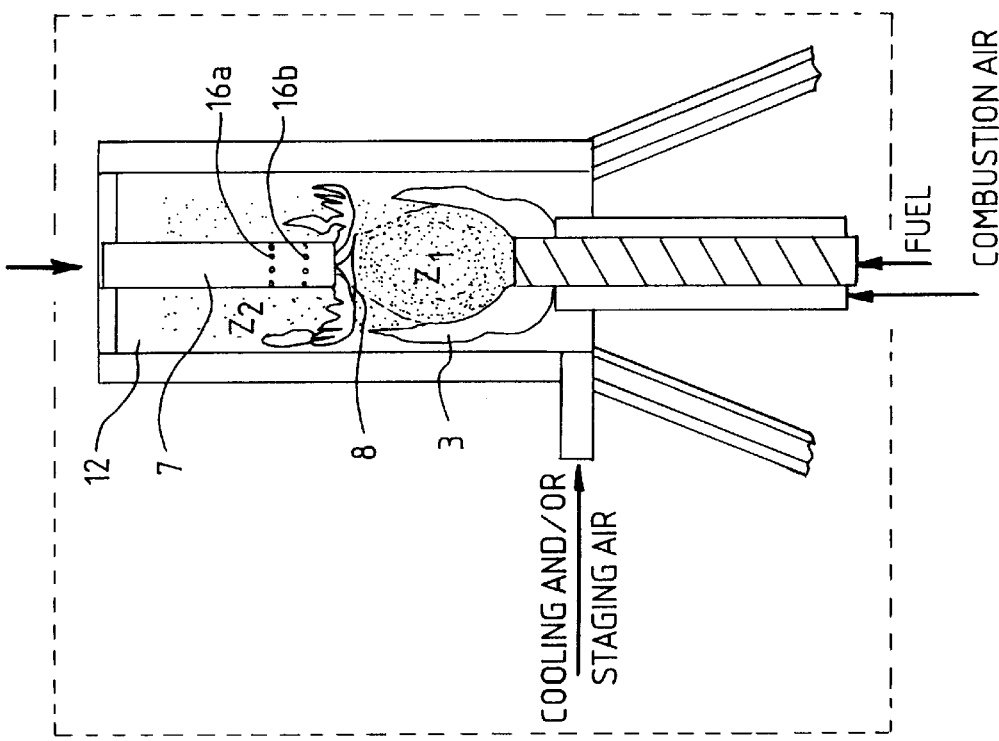

METHOD AND ARRANGEMENT FOR OPTIMIZING OXIDATION DURING BURNING OF GASEOUS AND LIQUID FUELS

The invention relates to a method for reducing emissions of nitrogen oxides upon burning of odor gases of a pulp mill in a combustion apparatus provided with a tubular furnace, said method comprising supplying odor gases and combustion air to the combustion apparatus from one end of the furnace, and discharging the resulting flue gases from the other end of the furnace.

The invention further relates to an arrangement for reducing the amount of nitrogen oxides formed during combustion when odor gases of a pulp mill are burnt in a combustion apparatus provided with a tubular furnace, said arrangement comprising a fuel channel for supplying odor gases to one end of the furnace, a combustion air duct for supplying combustion air to the furnace with the odor gases, and a discharge opening for discharging flue gases from the opposite end of the furnace.

Sulphurous odor gases are often burnt in so-called fire tube boilers, where fuel, combustion air and any staging air needed for controlling combustion are supplied to one end of a horizontal, tubular boiler space and flue gases are discharged from the opposite end of the boiler. It is generally known that the drawback of such boilers is the oxidation of nitrogen compounds into nitrogen oxides and the excessive oxidation of sulphur compounds into sulphur trioxide ($SO_3$). If, on the other hand, the oxidation is insufficient, the flue gases may contain reduced sulphur compounds (TRS compounds). It is generally known to use staging of combustion air for reducing emissions of nitrogen oxides. However, this cannot be easily performed in practice with the currently existing boiler construction, and in the case of old boilers it is impossible in practice using the known principles. As regards over-stoichiometric combustion of sulphurous gases, it is known that some of the sulphur compounds oxidate into sulphur trioxide ($SO_3$) on account of the large amount of excess oxygen during the supply of fuel and combustion air. When the flue gas cools down, the sulphur trioxide condenses with aqueous steam into sulphuric acid aerosol, which causes a so-called blue haze effect. If the flue gas is washed in a flue gas scrubber where sulphite chemicals are to be prepared for utilization, the yield of sulphite chemicals is reduced, since sulphate is produced directly from sulphur trioxide.

The object of the present invention is to provide a method and arrangement by which the drawbacks of the prior art can be avoided and the emissions of nitrogen oxides and sulphur trioxides can be considerably reduced in a boiler of this type.

The method of the invention is characterized in that combustion air is supplied sub-stoichiometrically to the furnace of the combustion apparatus simultaneously with the odor gases to reduce the formation of nitrogen oxides, and that additional air is supplied to the middle of the furnace of the boiler through a separate duct substantially in the transverse direction of the furnace at least at one point in such a manner that the total amount of additional air and combustion air corresponds at least to stoichiometric combustion, and that additional air is supplied to the furnace in the longitudinal direction thereof at such a point that the fuel that has not yet burnt at the point of additional air supply has time to substantially burn in the furnace of the combustion apparatus.

The arrangement of the invention is characterized in that it comprises a separate additional air duct which extends to the furnace and is arranged to supply additional air substantially to the middle of the furnace in the transverse direction thereof at least at one point in the longitudinal direction of the furnace.

The essential idea of the invention is that the combustion air required for burning is supplied at first in a sub-stoichiometric proportion so that the formation of nitrogen oxides is minimal. Thereafter additional air is supplied to the middle of the furnace, preferably through a duct extending from the opposite end of the furnace, at a suitable point of the furnace of the combustion apparatus so that the burning out takes place preferably under over-stoichiometric conditions in a tubular combustion space around the air supply duct. On account of the combustion conditions, the resulting amount of nitrogen oxides remains small. The essential idea of a preferred embodiment of the invention is that, in addition to staged additional air, a reducing reagent, such as ammonia, is supplied to the furnace of the combustion apparatus, preferably in the flow direction of the gases in the furnace prior to the supply of additional air to allow the formation of nitrogen oxides to be further reduced. According to yet another preferred embodiment, air is supplied to the furnace in the transverse direction thereof, and preferably at least at two successive points of the furnace in the longitudinal direction thereof.

In the following, the invention will be described in greater detail with reference to the accompanying drawings, in which FIG. 1 is a schematic view of a fire tube boiler in which the invention can be applied, and FIG. 2 shows another combustion apparatus, i.e. a so-called torch burner, in which the invention can be applied.

FIG. 1 shows a combustion apparatus 1 provided with a tubular furnace, i.e. a fire tube boiler with a water-cooled jacket 2 and a furnace 3. The furnace 3 comprises heat delivery surfaces 4 for recovering the heat produced during combustion. The furnace of the boiler is elongated in the horizontal direction. Its one end is provided with a fuel channel 5, through which odor gases or any other fuel are supplied to the furnace 3. It is further provided with a combustion air supply duct 6 which forms an annular duct around the fuel channel 5. An additional air duct 7 extends from the other end of the boiler to allow staged additional air to be supplied to the furnace 3 as desired. The end of the additional air duct 7 facing the furnace 3 comprises an air guide 8 of a conical or some other suitable shape for guiding staged air to flow in the transverse direction of the furnace 3 in a suitable manner so that it is mixed with the combustion gases in the furnace and with the fuel that has not yet burnt, as efficiently as possible. The end of the additional air duct 7 may be further provided with one or more reagent nozzles 9, through which a reagent, such as ammonia, having an effect on the formation of nitrogen oxides can be supplied to the furnace, if desired, through duct 10. The additional air duct 7 is preferably cooled with air, water or steam. A cooling medium may be supplied to a chamber or piping located within the housing of duct 7 and discharged therefrom through cooling channels 11, for example. Alternatively, the cooling may be performed by the use of staged air or separate air supplied, for instance, to the preheating of the combustion air or to the furnace of the boiler. At the right-hand end of the furnace 3, the flue gases turn to flow to the left in the figure, parallel with the heat delivery surfaces 4, whereby they heat the water which is in contact with the heat delivery surfaces. The heat delivery surfaces 4 are typically pipes that are disposed within the water jacket of the boiler so that the water is located outside the pipes and the flue gases flow through the pipes. Having flowed past the heat delivery surfaces 4 to the left end in the figure, the flue gases turn to flow to the right in the figure to a flue gas discharge opening 12. Usually this is implemented in such a manner that some of the heat delivery surfaces extend from the furnace 3 to a turning chamber 4a on the left in the figure, from which pipes extend on both sides of the pipes located in the middle to the discharge opening 12. The heat recovery and circulation of flue gases can naturally be implemented in several manners known per se. The essential feature is that flue gas is discharged from the furnace 3 at the end of the furnace that is opposite to the supply of fuel, either directly or through various ducts. The flue gas is discharged from the boiler through a flue gas duct connected to the discharge opening 12. The boiler may also be provided with another additional air supply duct 14 extending to the annular chamber 13 around the combustion air supply duct 6. From the chamber 13, the staged air is supplied through separate additional air ducts 15 to the furnace 3 around the fuel supply channel 5.

In the boiler illustrated in the figure the invention is implemented in such a manner that combustion air is supplied during the supply of odor gases and any auxiliary fuel sub-stoichiometrically so that the air ratio after the air has been supplied through duct 6 is about 0.5 to 0.7. In this case, the burning takes place sub-stoichiometrically, and the formation of nitrogen oxides is minimal. When the mixture which is rich in fuel propagates in the furnace 3, and the flowing takes place from left to right in accordance with FIG. 1, additional air is supplied to the mixture through the additional air duct 7 so that the final air ratio is over 1. The additional air supplied through the additional air duct 7 flows to the furnace in its transverse direction by the action of the guide 8, whereby the mixing and burning out take place efficiently in the tubular combustion space surrounding the additional air duct 7. The end of the additional air duct 7 is preferably located approximately in the middle of the furnace 3 of the boiler, but its position may be designed specifically in each case to achieve the desired result with the fuel used.

In order for the formation of nitrogen oxides to be further reduced, it is possible to supply a suitable reducing reagent, such as ammonia, to the furnace 3 from the end of the additional air duct 7 through one or more reagent nozzles 9. Such a reagent is preferably supplied to the furnace 3 in such a way that it mixes with the gases in the furnace prior to the supply of the additional air intended for staging. However, if desired, it may also be supplied either with the additional air or after the supply of additional air. The reagent is supplied through a suitably cooled reagent duct 10 extending within the additional air duct 7. The additional air duct 7, in turn, may be cooled merely with additional air or with separate cooling air, water or steam for maintaining the desired temperature. The cooling medium may be used for any suitable purposes, for example for preheating the combustion air to be supplied to the boiler 1. If desired, the supply of air at the forward end, i.e. at the fuel supply end, of the boiler may be staged by supplying additional air from a second staging duct 14 to around the combustion air duct 6 and the fuel channel 5 and further through separate additional air ducts 15. In this case, the second additional air mixes with the fuel and combustion gases slightly later than the actual combustion air supplied through duct 6. The essential feature is that the air ratio obtained as a result of the air supplied through the combustion air duct 6 and the second additional air duct 14 is below 1, preferably 0.5 to 0.7.

In the case illustrated in FIG. 1, additional air can be supplied from the end of the additional air duct 7 even at points which are closer to the flue gas duct and which are schematically indicated, by way of example, by broken lines 16a and 16b. This can be performed by providing suitable openings or nozzles at these points for supplying additional air to the furnace. In this case, the total amount of air supplied to the furnace must naturally correspond to an air ratio of 1 to enable stoichiometric combustion. The total amount of air is preferably over-stoichiometric, preferably corresponding to an air ratio of 1 to 1.3, whereby it is possible to ensure as efficient burning as possible.

FIG. 2 is a schematic view of the structure of another combustion apparatus 1 suitable for implementing the invention. This embodiment relates to a standby combustion apparatus, in this case a so-called torch burner, which is used for instance when a conventional boiler for burning odor gases breaks down for one reason or another. In this embodiment, the furnace 3 is vertical, and flue gases are usually discharged from an opening 12 which is provided at the upper end of the furnace and which has almost the same diameter as the furnace. In this embodiment, the odor gases and combustion air are supplied from one end of the furnace in a similar way as in FIG. 1, and the walls of the furnace are correspondingly cooled with additional air which may be supplied to an additional air duct 7 at the upper end of the furnace, for example through three hollow support arms 17, as shown in the figure. Additional air may be supplied at one or more points even in this embodiment so that the sub-stoichiometric conditions at the lower end of the furnace 3 are converted after the points of additional air supply into at least stoichiometric conditions, i.e. to correspond to an air ratio of 1, preferably over-stoichiometric. The emissions of nitrogen oxides, any sulphur trioxide and reduced sulphur compounds are thus reduced even in this embodiment compared with the existing arrangements.

In the specification above and in the drawings, the invention is described merely by way of example, and it is by no means restricted to this example. The essential feature is that fuel and combustion air are supplied from one end of a tubular furnace of a combustion apparatus 1, such as a boiler, in such a manner that the total air ratio is below 1, preferably 0.5 to 0.7, and that additional air is supplied to the furnace approximately in the middle of the furnace through an additional air duct 7 extending from the opposite direction in such a manner that the final total air ratio is at least 1. The additional air may also be supplied at several points over the length of the additional air duct 7 in such a way that the final air ratio gradually reaches at least the value 1. The structure and materials of the additional air duct 7 and the different cooling constructions may be selected freely from those suitable for the purpose. Furthermore, the additional air may be supplied from the duct to the furnace in different ways as long as it mixes effectively with the combustion gases resulting from the sub-stoichiometric combustion so that the combustion is as efficient as possible while the formation of nitrogen oxides is kept minimal. Instead of using merely a conical guide at the end of the duct, it is thus possible to use suitable nozzles mounted around the additional air duct 7 to allow the penetration of air to be appropriately adjusted in the transverse direction of the boiler. The essential feature is that, in the transverse direction of the boiler, the additional air is supplied substantially symmetrically in relation to its central axis so that the amount of additional air is approximately the same at each point of the cross-section to guarantee as efficient mixing and burning as possible. The cross-section of the tubular furnace is preferably roundish, i.e. circular or oval, but is may also be angular in various ways as long as the supply of air to the furnace is carried out appropriately. The additional air duct 7 extends preferably from one end of the furnace in the middle of the combustion space, whereby an annular combustion space is formed around it. In practice, however, it is possible to supply the additional air through a duct extending through the wall of the furnace as long as the air is supplied to the middle of the furnace, and the additional air duct comprises a duct extending towards the fuel channel in the longitudinal direction of the furnace to allow the additional air to be mixed before the flow is disturbed at the pipe extending through the wall.

What is claimed is:

1. A method for reducing emissions of nitrogen oxides upon burning of odor gases of a pulp mill in a combustion apparatus provided with a tubular furnace, which has first and second opposite ends and a tubular wall between said first and said second opposite ends and which defines a longitudinal direction and transverse directions, said method comprising supplying odor gases, as fuel, and combustion air to the combustion apparatus from said first end of the furnace, and discharging the resulting flue gases from said second end of the furnace, wherein said combustion air is supplied sub-stoichoimetrically to the furnace of the combustion apparatus simultaneously with the odor gases to reduce the formation of nitrogen oxides, and wherein additional air is supplied at one or more points to a middle region of the furnace of the combustion apparatus from the middle of the furnace towards the walls through a separate duct which extends into the furnace from said second end wherein the total amount of said additional air and said combustion air corresponds at least to stoichiometric combustion.

2. A method according to claim 1, wherein at least some of the additional air is supplied substantially transversely from the duct to the furnace of the combustion apparatus.

3. A method according to claim 2, wherein at least some of the additional air is supplied as a substantially uniform annular air jet transverse to the furnace.

4. A method according to claim 1, wherein at least some of the additional air is supplied at at least two successive points spaced longitudinally from one another within the furnace.

5. A method according to claim 1, wherein a suitable reducing reagent is supplied to the furnace during the supply of the additional air.

6. A method according to claim 5, wherein the reagent is supplied to the furnace immediately prior to the supply of the additional air.

7. A method according to claim 1, wherein said combustion air is supplied at a ratio of below 1 of stoichiometric combustion.

8. An arrangement for reducing the amount of nitrogen oxides formed during combustion when odor gases of a pulp mill are burnt in a combustion apparatus provided with a tubular furnace, which has first and second opposite ends and a tubular wall between said first and said second ends and which defines a longitudinal direction and transverse directions, said arrangement comprising a fuel channel for supplying odor gases, as fuel, to said first end of the furnace, a combustion air duct for supplying combustion air to the furnace with the odor gases to said first end, and a discharge opening for discharging flue gases from said second end of the furnace, wherein said arrangement further comprises a separate additional air duct which extends into the furnace from said second end and which is arranged to supply additional air substantially to a middle region of the furnace and transversely at one or more points within the furnace from the middle of the furnace outwards.

9. An arrangement according to claim 8, wherein said arrangement comprises means for supplying at least some of the additional air to the furnace at two or more points spaced longitudinally within the furnace.

10. An arrangement according to claim 9, wherein the additional air duct comprises means for supplying at least some of the additional air transversely into the furnace.

11. An arrangement according to claim 10, further comprising means for supplying some of the additional air as a substantially annular flow to the furnace.

12. An arrangement according to claim 11, wherein said arrangement comprises means for supplying some of the additional air to the furnace from the end to which the fuel is supplied but at a distance from where the fuel and combustion air are supplied.

13. An arrangement according to claim 8, wherein said arrangement comprises means for supplying a reagent to the furnace substantially where the additional air duct supplies the additional air supplied by said duct.

14. An arrangement according to claim 13, wherein the means for supplying the reagent is arranged to supply the reagent to the furnace in a longitudinal direction from said second end prior to the supply of the additional air supplied by the additional air duct.

15. A method according to claim 5, characterized in that the reagent is ammonia.

16. A method according to claim 7, wherein said combustion air is supplied in a range of from 0.5 to 0.7 of stoichiometric combustion.

17. An arrangement according to claim 13, characterized in that the reagent is ammonia.

* * * * *